(12) United States Patent
Christensen et al.

(10) Patent No.: US 10,031,010 B2
(45) Date of Patent: Jul. 24, 2018

(54) ULTRASONIC MEASUREMENT DEVICE AND A METHOD FOR OPERATING THE SAME

(75) Inventors: Torben Amby Christensen, Sonderborg (DK); Robert Schaefer, Northport, NY (US)

(73) Assignee: Siemens Aktiengesellschaft, Munich (DE)

( * ) Notice: Subject to any disclaimer, the term of this patent is extended or adjusted under 35 U.S.C. 154(b) by 712 days.

(21) Appl. No.: 14/241,686

(22) PCT Filed: Aug. 30, 2011

(86) PCT No.: PCT/EP2011/064922
§ 371 (c)(1),
(2), (4) Date: Feb. 27, 2014

(87) PCT Pub. No.: WO2013/029664
PCT Pub. Date: Mar. 7, 2013

(65) Prior Publication Data
US 2014/0202258 A1 Jul. 24, 2014

(51) Int. Cl.
*G01F 1/66* (2006.01)
*G01F 25/00* (2006.01)

(52) U.S. Cl.
CPC .............. *G01F 1/662* (2013.01); *G01F 1/667* (2013.01); *G01F 25/0007* (2013.01)

(58) Field of Classification Search
USPC ............................ 73/861.28, 861.29; 702/48
See application file for complete search history.

(56) References Cited

U.S. PATENT DOCUMENTS

| 5,831,175 A | 11/1998 | Fletcher-Haynes |
| 2006/0185443 A1* | 8/2006 | Fujimoto ................. C21D 7/00 73/861.28 |

\* cited by examiner

*Primary Examiner* — Lam Nguyen
(74) *Attorney, Agent, or Firm* — Cozen O'Connor

(57) ABSTRACT

A method for operating an ultrasonic device comprising a first and second ultrasonic transducers, includes driving the first and second transducers at a driving frequency such that the first and second transducers generate a first and a second signals, respectively. The method also includes sensing the second signal at the first transducer to produce a first measurement signal and sensing the first signal at the second transducer to produce a second measurement signal. The method further includes identifying a first set of data-points in the first measurement signal and a second set of data-points in the second measurement signal. The method also includes generating a frequency data-series using the first set of data-points and a corresponding data-point in the second set of data-points. The method also includes performing statistical operations based on the frequency data-series and configuring an operating frequency for driving the first and second transducers using the operations.

4 Claims, 10 Drawing Sheets

ULTRASONIC MEASUREMENT DEVICE
AND A METHOD FOR OPERATING THE
SAME

CROSS-REFERENCE TO RELATED
APPLICATIONS

This is a U.S. national stage of PCT Application No. PCT/EP2011/064922, filed on 30 Aug. 2011, which is hereby incorporated in its entirety by reference.

FIELD OF THE INVENTION

The present invention relates to an ultrasonic measurement device and a method for operating the same. In particular, the present invention relates to an ultrasonic measurement device operable in non-reciprocal conditions and a method for operating the ultrasonic measurement device.

DESCRIPTION OF THE RELATED ART

Ultrasonic measurement devices are used in a myriad of applications ranging from measurement instruments to medical imaging instruments, and so on. One specific application of an ultrasonic measurement device is a transit-time ultrasonic flowmeter.

A transit-time ultrasonic flowmeter measures the flow velocity of fluids flowing in a conduit by determining the difference in transit time corresponding to ultrasonic signals transmitted upstream and downstream through a fluid flow path. Typically, the transit-time ultrasonic flowmeter includes a first ultrasonic transducer and a second ultrasonic transducer suitably positioned along the fluid flow path. The first and the second ultrasonic transducers may be suitably inserted into the conduit, a configuration referred to as in-line configuration. Alternatively, the first and second ultrasonic transducers may be externally coupled to the outside of the conduit, a configuration referred to as clamp-on configuration. The basic principle of operation of the ultrasonic flowmeter of either configuration remains the same, as outlined below.

An electrical excitation signal is applied to the first ultrasonic transducer which transmits an ultrasonic signal. The ultrasonic signal travels through the fluid towards the second ultrasonic transducer, which receives the ultrasonic signal and generates an electrical measurement signal corresponding to the ultrasonic signal. Thereby, the transit time in one direction is measured. The process is repeated in the other direction with the second ultrasonic transducer acting as a transmitter and the first ultrasonic transducer acting as a receiver to measure the transit time in the reverse direction. Finally, the difference in transit times in the two directions is used to determine the flow velocity of the fluid.

The basic principle of operation of an ultrasonic flowmeter, as described above, is based on the assumption of reciprocity in the upstream and the downstream paths, that is to say, the time difference between the upstream and the downstream transit times is exclusively due to the fluid flow. In other words, under zero-flow conditions, the transit-times of the upstream and the downstream ultrasonic signals should be identical. However, this assumption may not hold true in practical applications due to several reasons.

One of the well-known reasons for non-reciprocity is faulty installation of at least one of the ultrasonic transducers, faulty auxiliary electronics associated with at least one of the ultrasonic transducers, and so on.

Another important source of non-reciprocity results from variations in various parameters associated with one or more constituent elements of the ultrasonic flowmeter, such as ultrasonic transducers, coupling means, cables, and auxiliary electronics. For example, an ultrasonic transducer may be in the form of a piezoelectric ceramic disc wherein each stated dimension of the piezoelectric ceramic disc has a tolerance of +1-10 percent. Although such variations in these parameters may be well within the stated manufacturing tolerances of the constituent elements, the accuracy of ultrasonic flowmeter may be significantly affected owing to such variations.

The non-reciprocity in an ultrasonic flowmeter induced due to the above-stated reasons may be referred to as inherent non-reciprocity of the ultrasonic flowmeter.

In addition to the inherent non-reciprocity, as described above, an ultrasonic flowmeter is prone to flow-induced non-reciprocity. The flow-induced non-reciprocity leads to differences in the upstream and the downstream ultrasonic signals during finite flow conditions in the conduit, and those differences are over and above the differences caused in the upstream and the downstream ultrasonic signals during zero flow conditions in the conduit.

The primary reason for flow-induced non-reciprocity is related to the acoustic properties of the fluid flowing in the conduit. Consider, for example, the case of a clamp-on ultrasonic flowmeter. In this case, the ultrasonic signal from the transmitting transducer enters the fluid through the conduit wall in such a manner that multiple acoustic reflections are created in the conduit wall. These acoustic reflections also reach the receiving transducer where the main ultrasonic signals and the acoustic reflections interfere to produce a final signal, which is sensed by the receiving transducer. The acoustic reflections may interfere constructively or destructively depending upon a number of factors, including but not limited to, acoustic properties of the fluid, flow rate, transducer spacing, and so on. Moreover, the acoustic reflections exhibit differential properties in the upstream and the downstream directions, and the differential properties lead to the flow-induced non-reciprocity in the ultrasonic flowmeter.

Various systems and methods known in the art implement a zero calibration technique in which the transit time differences between an upstream and a downstream ultrasonic signal is determined under zero flow conditions, and the difference is regarded as a "zero error" and the ultrasonic flowmeter scale is calibrated accordingly. However, this widely used zero calibration technique merely accounts for the inherent non-reciprocity of the ultrasonic flowmeter. Such prior art systems and methods fail to recognize and address the additional non-reciprocity induced during finite flow conditions, that is, the flow-induced non-reciprocity, as described above. Accordingly, the systems and the methods known in the art lead to erroneous flow measurements during operation of the ultrasonic flowmeter.

SUMMARY OF THE INVENTION

In light of the foregoing, there is a need for an ultrasonic measurement device, such as an ultrasonic flowmeter, capable of providing accurate measurements under non-reciprocal conditions and a method for operating such an ultrasonic measurement device.

Accordingly, it is an objective of the present invention to provide an ultrasonic measurement device capable of providing accurate measurements under non-reciprocal conditions and a method for operating the ultrasonic measurement device.

This and other objects and advantages are achieved in accordance with the invention by a device and method for operating an ultrasonic measurement device that comprises a first ultrasonic transducer and a second ultrasonic transducer. The first and second ultrasonic transducers are driven at a driving frequency such that the first and second ultrasonic transducers generate a first ultrasonic wave and a second ultrasonic wave, respectively. The second ultrasonic wave is sensed at the first ultrasonic transducer to produce a first measurement signal. Similarly, the first ultrasonic wave is sensed at the second ultrasonic transducer to produce a second measurement signal. Subsequently, a first set of data points are identified in the first measurement signal and a second set of data points are identified in the second measurement signal such that each data point in the first set of data points uniquely corresponds to a data point in the second set of data points. A frequency data series is generated by successively determining a time difference between time instants corresponding to each data point in the first set of data points and a corresponding data point in the second set of data points. Thereafter, one or more statistical operations are performed based on the frequency data series. The aforementioned steps are performed for at least one driving frequency in a set of driving frequencies suitable for driving the first and second ultrasonic transducers. Finally, an operating frequency suitable for driving the first and second ultrasonic transducers is configured based on the one or more statistical operations that are performed based on the frequency data series corresponding to the at least one driving frequency.

Thus, the first embodiment of the present invention provides a method for operating an ultrasonic measurement device such that the ultrasonic measurement device is driven at an optimum frequency under non-reciprocal conditions to provide accurate measurements.

In one embodiment of the present invention, a sub-set of contiguous data points is selected from the first set of data points corresponding to the operating frequency and a corresponding sub-set of contiguous data points is selected from the second set of data points. A range data series is generated based on successively determining a time difference between time instants corresponding to each data point in the sub-set of the first set of data points and a corresponding data point in the sub-set of the second set of data points. Subsequently, one or more statistical operations are performed based on the range data series. A signal detection range suitable for detecting arrival of the first and second ultrasonic waves is configured based on the one or more statistical operations that are performed based on range data series corresponding to at least one sub-set of data points in the first set of data points. This technical feature of the present invention facilitates detection of ultrasonic signals based on an optimum trade-off between signal strength and effects of non-reciprocal conditions for a given operating frequency.

In another embodiment of the present invention, the one or more statistical operations comprise at least one of determining variance, determining standard-deviation, regression analysis, and curve-fitting. This technical feature facilitates statistical analysis of the frequency data series and/or the range data series to determine an optimum frequency and optimum signal detection range for operating the ultrasonic measurement device.

A second embodiment of the present invention includes a method for diagnosis in an ultrasonic measurement device. The ultrasonic measurement device comprises a first ultrasonic transducer and a second ultrasonic transducer. The first and second ultrasonic transducers are driven at an operating frequency such that the first and second ultrasonic transducers generate a first ultrasonic wave and a second ultrasonic wave, respectively. The second ultrasonic wave is sensed at the first ultrasonic transducer to produce a first measurement signal and the first ultrasonic wave is sensed at the second ultrasonic transducer to produce a second measurement signal. A first set of data points is identified in the first measurement signal and a second set of data points is identified in the second measurement signal such that each data point in the first set of data points uniquely corresponds to a data point in the second set of data points. A frequency data series is generated based on successively determining a time difference between time instants corresponding to each data point in the first set of data points and a corresponding data point in the second set of data points. Subsequently, one or more statistical operations are performed based on the frequency data series. A first diagnostic event is generated based on at least one statistical operation based on the frequency data series.

Thus, the second embodiment of the present invention provides a method for diagnosis in an ultrasonic measurement device such that a diagnostic event is generated in case the ultrasonic measurement device is not driven at an optimum operating frequency under non-reciprocal conditions.

In one embodiment of the present invention, a frequency data series is generated and one or more statistical operations are performed thereon for at least one driving frequency in a set of driving frequencies suitable for driving the first and second ultrasonic transducers such that the driving frequency is not same as the operating frequency in a manner similar to that for the operating frequency. The first diagnostic event is generated based on at least one statistical operation corresponding to the at least one driving frequency and at least one statistical operation corresponding to the operating frequency. This technical feature ensures that the first diagnostic event is generated only if a more optimum operating frequency may be selected from the set of driving frequencies.

In another embodiment of the present invention, a sub-set of contiguous data points is selected from the first set of data points corresponding to the operating frequency and a corresponding sub-set of contiguous data points is selected from the second set of data points. A range data series is generated based on successively determining a time difference between time instants corresponding to each data point in the sub-set of the first set of data points and a corresponding data point in the sub-set of the second set of data points. Subsequently, one or more statistical operations are performed based on the range data series. A second diagnostic event is generated based on at least one statistical operation that is performed based on the range data series. This technical feature facilitates generating a diagnostic event in case detection of ultrasonic signals deviates from an optimum trade-off between signal strength and effects of non-reciprocal conditions.

A third embodiment of the present invention includes an ultrasonic measurement device. The ultrasonic measurement device comprises a first ultrasonic transducer and a second ultrasonic transducer. Further, the ultrasonic measurement device comprises a driving module, a sensing module, a signal processing module, and a configuration module. Each of the first and second ultrasonic transducers is suitable for electro-mechanical energy inter-conversion. The driving module is configured for driving the first and second ultrasonic transducers at a driving frequency such that the first and second ultrasonic transducers generate a first ultrasonic wave and a second ultrasonic wave, respectively. The sensing module is configured for sensing the second ultrasonic wave at the first ultrasonic transducer to produce a first measurement signal and sensing the first ultrasonic wave at the second ultrasonic transducer to produce a second measurement signal. The signal processing module is configured for (1) identifying a first set of data points in the first measurement signal and a second set of data points in the second measurement signal such that each data point in the first set of data points uniquely corresponds to a data point in the second set of data points, (2) generating a frequency data series based on successively determining a time difference between time instants corresponding to each data point in the first set of data points and a corresponding data point in the second set of data points, and (3) performing one or more statistical operations based on the frequency data series. The configuration module is configured for configuring the driving module for an operating frequency suitable for driving the first and second ultrasonic transducers based on the one or more statistical operations that are performed based on the frequency data series corresponding to at least one driving frequency in a set of driving frequencies suitable for driving the first and second ultrasonic transducers.

Thus, the third embodiment of the present invention provides an ultrasonic measurement device suitable for configuration to be driven at an optimum frequency under non-reciprocal conditions to provide accurate measurements.

In one embodiment of the present invention, the signal processing module is further configured for (1) selecting a sub-set of contiguous data points from the first set of data points corresponding to the operating frequency and a corresponding sub-set of contiguous data points from the second set of data points, (2) generating a range data series based on successively determining a time difference between time instants corresponding to each data point in the sub-set of the first set of data points and a corresponding data point in the sub-set of the second set of data points, and (3) performing one or more statistical operations based on the range data series. In addition, the configuration module is further configured for configuring the sensing module for a signal detection range suitable for sensing arrival of the first and second ultrasonic waves based on the one or more statistical operations that are performed based on the range data series corresponding to at least one sub-set of data points in the first set of data points. This technical feature of the present invention facilitates detection of ultrasonic signals based on an optimum trade-off between signal strength and effects of non-reciprocal conditions for a given operating frequency.

In another embodiment of the present invention, the ultrasonic measurement device further comprises a diagnostic module configured for generating a diagnostic event based on at least one statistical operation associated with at least one of the frequency data series and the range data series. This technical feature facilitates generating a diagnostic event in case the ultrasonic measurement device is not driven at an optimum frequency under non-reciprocal conditions. In addition, this technical feature also facilitates generating a diagnostic event in case detection of ultrasonic signals deviates from an optimum trade-off between signal strength and effects of non-reciprocal conditions.

BRIEF DESCRIPTION OF THE DRAWINGS

The present invention is further described hereinafter with reference to illustrated embodiments shown in the accompanying drawings, in which.

Figure 1:
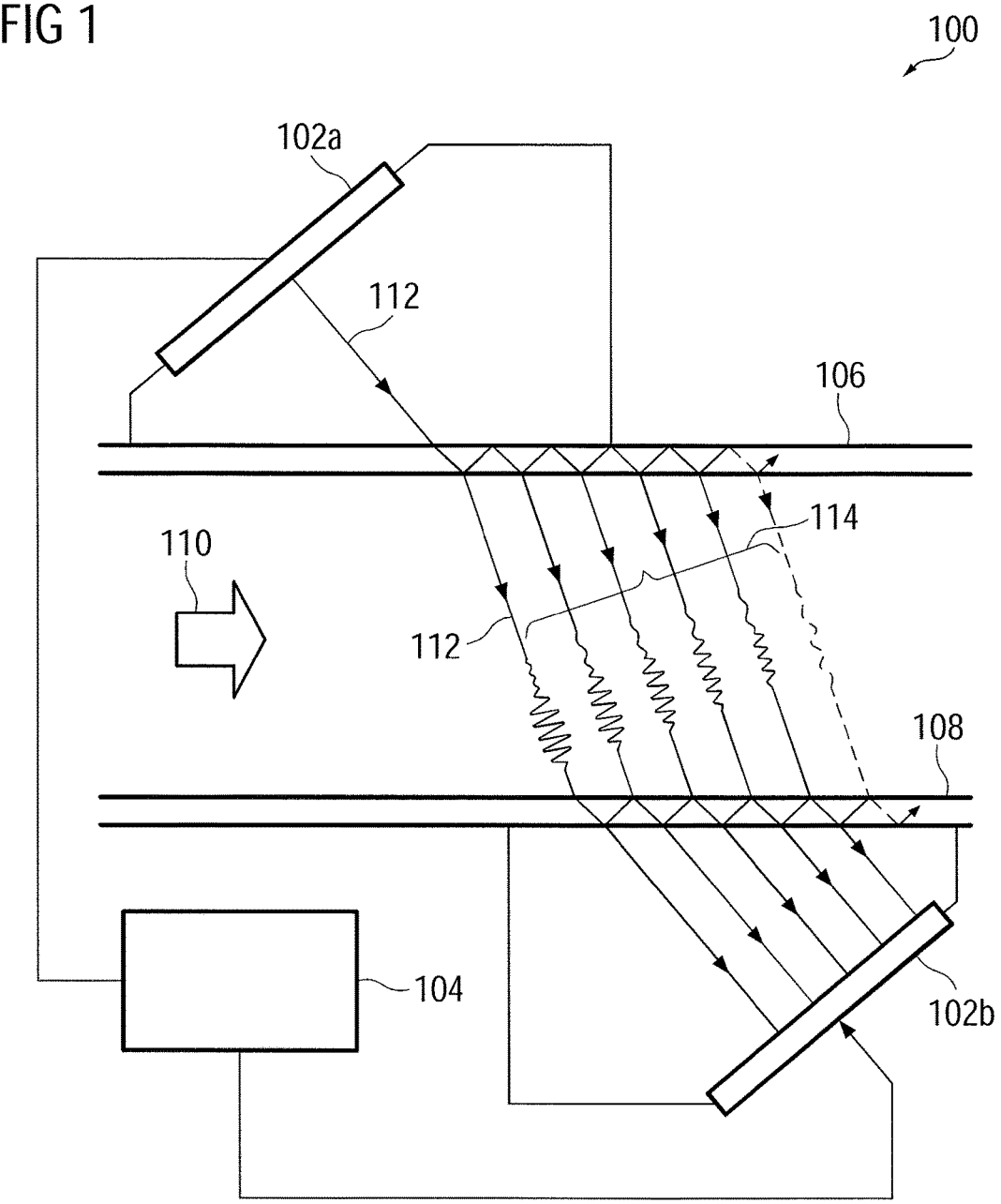
FIG. 1 illustrates a schematic representation of an ultrasonic flowmeter in accordance with one embodiment of the present invention.

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

DETAILED DESCRIPTION OF THE PRESENTLY PREFERRED EMBODIMENTS

FIG. 1 illustrates a schematic representation of an environment in which an ultrasonic flowmeter 100 is used. The ultrasonic flowmeter 100 includes a first ultrasonic transducer 102a, a second ultrasonic transducer 102b, and a control module 104. The environment includes a conduit 106 and a fluid 110 flowing through the conduit 106. The conduit 106 includes a conduit wall 108. The first ultrasonic transducer 102a generates an ultrasonic signal 112, which in turn, leads to generation of a plurality of acoustic reflections 114.

It should be noted that the ultrasonic flowmeter 100 shown in FIG. 1 is a clamp-on ultrasonic flowmeter. However, various embodiments of the present invention are equally applicable to in-line ultrasonic flowmeters as well.

During operation of the ultrasonic flowmeter 100, the first ultrasonic transducer 102a generates the first ultrasonic signal 112 based on an operating frequency of the ultrasonic flowmeter 100. The ultrasonic signal 112 enters the conduit 106 through the conduit wall 108. As the first ultrasonic signal 112 enters the conduit 106 through the conduit wall 108, at least a part of the first ultrasonic signal 112 is internally reflected, first from the inner surface and then, from the outer surface of the conduit wall 108. This reflected signal then enters the conduit 106 in the form of first order acoustic reflection. This phenomenon repeats in turn for each acoustic reflection to give rise to higher order acoustic reflections. The multiple acoustic reflections have been collectively depicted as the plurality of acoustic reflections 114.

The second ultrasonic transducer 102b receives the first ultrasonic signal 112 along with the acoustic reflections 114, and generates a corresponding electrical signal. The electrical signal is transmitted to the control module 104.

The above steps are subsequently repeated in a similar manner with the second ultrasonic transducer 102b transmitting a second ultrasonic signal based on the operating frequency of the ultrasonic flowmeter 100. The ultrasonic signal, along with the acoustic reflections, is received at the first ultrasonic transducer 102a. The first ultrasonic transducer 102a generates a corresponding electrical signal, which is transmitted to the control module 104.

The control module 104 receives the electrical signals from the first and second ultrasonic transducers 102 and generates a first measurement signal and a second measurement signal, respectively. The first and second measurement signals are shown in FIG. 2.

It should be noted that various embodiments of the present invention are being explained in the context of an ultrasonic flowmeter. However, the present invention is applicable to any ultrasonic measurement device which is operated under non-reciprocal conditions. Further, in case of a multipath ultrasonic flowmeter, various embodiments of the present invention are applicable to individual ultrasonic transducer pairs included in the multipath ultrasonic flowmeter.

Figure 2:
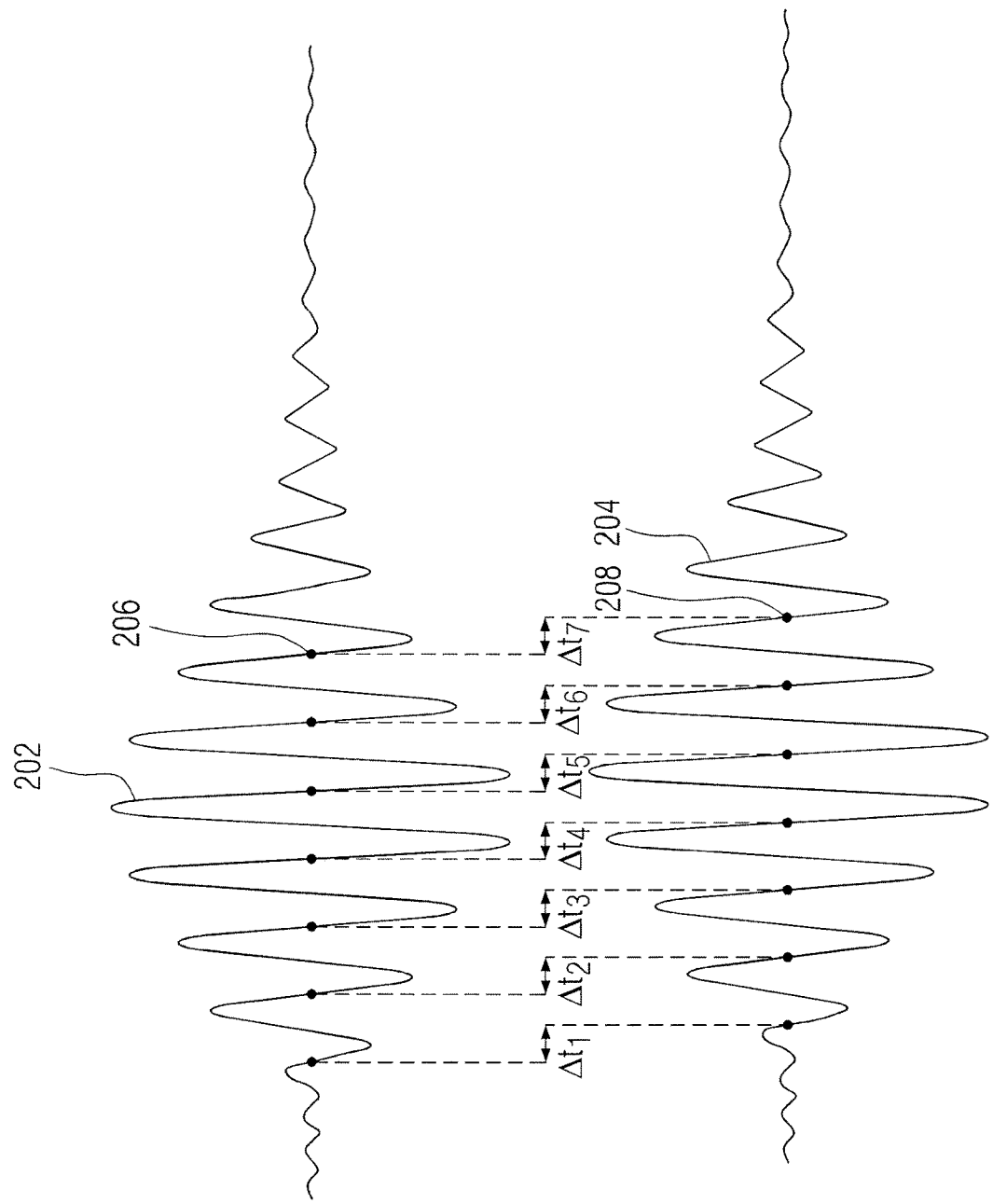
FIG. 2 illustrates a graphical representation of a first measurement signal and a second measurement signal in accordance with one embodiment of the present invention.

FIG. 2 illustrates a graphical representation of a first measurement signal 202 and a second measurement signal 204. In addition, FIG. 2 depicts a first set of data points 206 and a second set of data points 208.

During operation of the ultrasonic flowmeter 100 in accordance with an embodiment of the present invention, as a first step, the first set of data points 206 is identified in the first measurement signal 202. In one embodiment of the present invention, each data point corresponds to a zero-crossing from a positive to a negative value in the first measurement signal 202. In case a signal-to-noise ratio (SNR) is below a threshold value, a suitable offset may be introduced to avoid spurious detection of zero-crossings. Thus, in general, any suitable threshold value may be defined for identifying the first set of points. In the following description of the present invention, the term zero-crossing, unless otherwise specified is intended to include all such possibilities. Thus, the first set of data points 206 includes a first zero-crossing, a second zero-crossing, and so on in the first measurement signal 202.

Subsequently, the second set of data points 208 is identified in the second measurement signal 204 in a similar manner. Thus, the second set of data points 208 includes a first zero-crossing, a second zero-crossing, and so on in the second measurement signal 204. Thus, each data point in the first set of data points 206 uniquely corresponds to a data point in the second set of data points 208.

Thereafter, a time difference between the time instants corresponding to a data point in the first set of data points 206 and a corresponding data point in the second set of data points 208 is successively determined for each pair of corresponding data points in the first and second measurement signals 202 and 204. Thus, a time-difference data series is generated, as shown in FIGS. 3A and 3B.

Figure 3A:
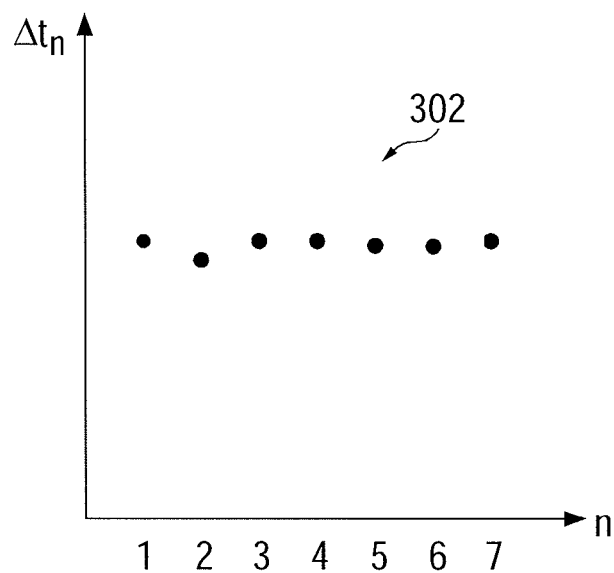
FIGS. 3A-3B illustrate two exemplary representations of a time-difference data series plots in accordance with one embodiment of the present invention.
Figure 3B:
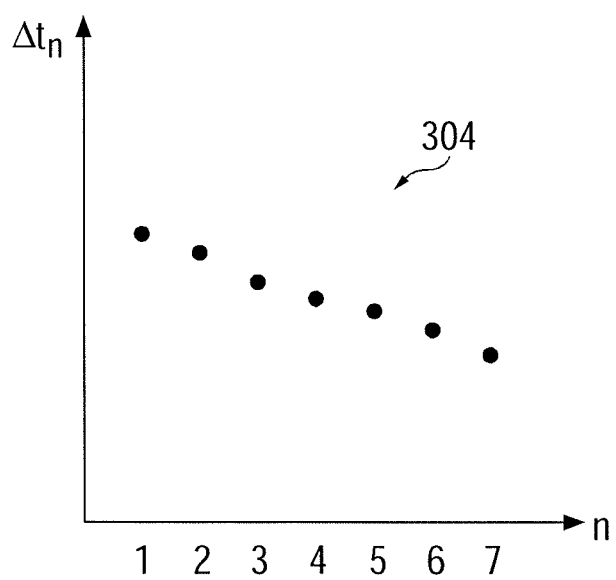

FIGS. 3A and 3B illustrate two exemplary representations of a time-difference data series plots 302 and 304. Each time-difference data series plot depicts time-differences for multiple pairs of data points in the first and second set of data points 206 and 208.

In order to accurately measure the transit time difference between the first and second measurement signals 202 and 204, it is required that the first and second measurement signals 202 and 204 have substantially identical waveforms. In case the first and second measurement signals 202 and 204 have identical waveforms, the time-difference data series plot yields a curve with a flat-response, similar to time-difference data series plot 302.

On the other hand, in case of mismatch between the first and second measurement signals 202 and 204, the time-difference data series plot yields a curve with a non-zero slope, similar to time-difference data series plot 304.

The mismatch between the first and second measurement signals 202 and 204 is a function of non-reciprocity in the ultrasonic flowmeter 100 and a set of operating parameters such as an operating frequency of the ultrasonic transducers 102.

The present invention provides for investigating the time-difference data series plots, such as the time-difference data series plots 302 and 304, under varying operating conditions and suitably configuring the ultrasonic flowmeter 100 based on the results obtained from the investigation.

Having described the basic principle of the present invention in conjunction with the foregoing figures, the present invention will now be described in more detail in the following figures.

Figure 4:
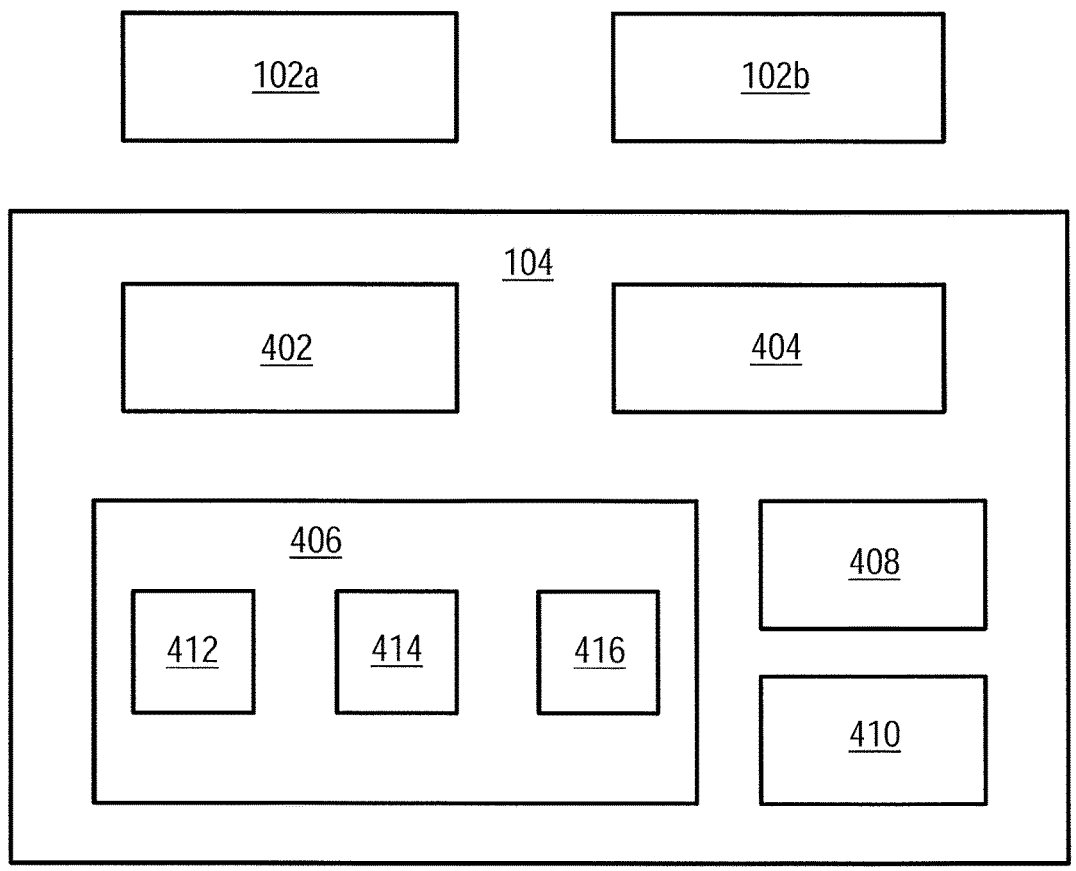
FIG. 4 illustrates a block diagram representation of an ultrasonic flowmeter in accordance with one embodiment of the present invention.

FIG. 4 illustrates a block diagram representation of an ultrasonic flowmeter 100. As explained in conjunction with FIG. 1, the ultrasonic flowmeter 100 includes the first and second ultrasonic transducers 102a, 102b, and the control module 104. The control module 104 includes a driving module 402, a sensing module 404, a signal processing module 406, a configuration module 408, and a diagnostic module 410. The signal processing module 406 includes data sampling module 412, a data-series generating module 414, and a statistical computation module 416.

The first and second ultrasonic transducers 102 are suitable for electro-mechanical energy inter-conversion. Thus, when an electrical excitation signal is provided to the ultrasonic transducers 102a, 102b, the ultrasonic transducers 102a, 102b generate an ultrasonic signal and vice-versa.

The conversion efficiency of an ultrasonic transducer varies with frequency of the electrical excitation signal. An ultrasonic transducer typically has an inverted bell-shaped frequency response. The frequency selectivity of the ultrasonic transducer is indicated by the Q value of the ultrasonic transducer. A low Q value indicates low peak efficiency but a wide frequency range of operation. Conversely, a high Q value indicates high peak efficiency but narrower frequency range of operation. A wide-band transducer has a low Q value such that it may be operated within a wide range of frequencies without any significant reduction in the conversion efficiency.

In accordance with one embodiment of the present invention, each ultrasonic transducer 102a/102b is a wide-band ultrasonic transducer, and hence, is operable within a wide range of operating frequencies.

The driving module 402 drives the first and second ultrasonic transducers 102a, 102b at a driving frequency such that the first and second ultrasonic transducers 102a, 102b generate a first ultrasonic signal and a second ultrasonic signal respectively. In various embodiments of the present invention, the driving module 402 is configured to operate at a set of driving frequencies within the wide range of operating frequencies suitable for operating the ultrasonic transducers 102a, 102b. Any desired number of driving frequencies may be included in the set of driving frequencies so long as the driving frequencies are within the wide range of operating frequencies of the ultrasonic transducers 102a, 102b.

It should be noted that in various embodiments of the present invention, the term "driving frequency", as used herein, is intended to refer to any suitable signal modality such as a discrete frequency signal, a dual-frequency signal, a coded frequency signal, and so on.

During operation of the ultrasonic flowmeter 100, the driving module 402 drives the first and second ultrasonic transducers 102a, 102b at a driving frequency selected from the set of driving frequencies suitable for driving the first and second ultrasonic transducers 102a, 102b. This results in generation of a first and second ultrasonic signals from the first and second ultrasonic transducers 102a, 102b, respectively. The ultrasonic signal from one ultrasonic transducer 102a/102b is received on the other ultrasonic transducer 102b/102a. The ultrasonic signals are converted to electrical signals, which are provided to the sensing module 404.

The sensing module 404 senses the second ultrasonic signal received at the first ultrasonic transducer 102a to produce a first measurement signal 202. Similarly, the sensing module 404 senses the first ultrasonic signal at the second ultrasonic transducer 102b to produce a second measurement signal 204.

The signal processing module 406 identifies a first set of data points 206 in the first measurement signal 202 and a second set of data points 208 in the second measurement signal 204. As explained in conjunction with FIG. 2, each data point in the first set of data points uniquely corresponds to a data point in the second set of data points.

Thereafter, a time difference between the time instants corresponding to a data point in the first set of data points 206 and a corresponding data point in the second set of data points 208 is successively determined for each pair of corresponding data points in the first and second measurement signals 202 and 204. Thus, a first time-difference data series is generated. The time-difference data series corresponds to the driving frequency at which the driving module 402 drives the first and second ultrasonic transducers 102a, 102b and, for clarity, it is referred to as a frequency data series.

Subsequently, the signal processing module 406 performs one or more statistical operations based on the frequency data series. In accordance with various embodiments of the present invention, the statistical operations include, but are not limited to, determining variance, determining standard-deviation, regression analysis, and curve-fitting. In one embodiment of the present invention, the frequency data series is plotted against the position of data points in the first and second set of data points to generate a two-dimensional scatter plot and subsequently, a line of best fit is generated and slope of the line of best fit is determined. As explained in conjunction with FIGS. 3A and 3B, the slope of the line of best fit should ideally be zero.

The driving module 402, sensing module 404, and the signal processing module 406 may successively perform their respective operations for multiple driving frequencies included in the set of driving frequencies. Such operations may be completed when the slope of the line of best fit is below a predefined threshold value. The corresponding driving frequency is selected as the operating frequency of the ultrasonic flowmeter 100. Alternatively, the operation may be completed when each driving frequency in the set of driving frequencies is used. In this case, the driving frequency that generates the line of best fit with the least value of slope is selected as the operating frequency of the ultrasonic flowmeter 100.

The configuration module 408 configures the driving module 402 to drive the first and second ultrasonic transducers 102a, 102b according to the selected operating frequency.

In accordance with one embodiment of the present invention, subsequent to identification of a suitable operating frequency as described above, a suitable signal detection range is also identified. In this embodiment, for a given operating frequency, the signal processing module 406 selects a sub-set of contiguous data points from the first set of data points 206 and a corresponding sub-set of contiguous data points from the second set of data points 208. In various embodiments of the present invention, the sub-set of contiguous data points may include two or more data points.

Thereafter, a time difference between time instants corresponding to each data point in the sub-set of the first set of data points and a corresponding data point in the sub-set of the second set of data points is determined. Thus, a second time-difference data series is generated. The time-difference data series corresponds to a defined range for a given operating frequency. Hence, for clarity, it is referred to as a range data series.

Subsequently, the signal processing module 406 performs one or more statistical operations based on the range data series in similar manner as the one or more statistical operations for frequency data series. Thus, the statistical operations include, but are not limited to, determining variance, determining standard-deviation, regression analysis, and curve-fitting. In one embodiment of the present invention, the sub-set of contiguous data points that provides the least value of the slope of the line of best fit is selected.

In case two or more sub-sets of contiguous data points provide the same or substantially same value of the slope of the line of best fit, the sub-set of contiguous data points corresponding to an earlier part of a corresponding frequency data series plot is selected. Further, additional criterion such as signal strength may be included while selecting the sub-set of contiguous data points for the signal detection range.

The configuration module 408 configures the sensing module 404 for a signal detection range suitable for sensing arrival of the first and second ultrasonic signals in accordance with the selected sub-set of contiguous data points. For example, each sub-set of contiguous data points may include three data points, and the middle data point is selected for configuring the signal detection range. Thus, for example, if the selected sub-set of contiguous data points includes third, fourth, and fifth zero crossings, the sensing module 404 is configured to detect the arrival of ultrasonic signals at the fourth zero-crossing and so on.

The diagnostic module 410 is an optional module. The diagnostic module 410 may trigger the signal processing module 406 to generate a frequency data series corresponding to an operating frequency configured in the ultrasonic flowmeter 100. In case the slope of the line of best fit thus obtained is below a predefined threshold, a first diagnostic event may be generated.

The diagnostic event may automatically initiate an operating frequency configuration as explained above. Alternatively, such diagnostic event may alert a user of the ultrasonic flowmeter 100 to halt the operation of the ultrasonic flowmeter 100 and re-configure the operating frequency.

Alternatively, the diagnostic module 410 may trigger the signal processing module 104 to generate a range data series corresponding to an operating frequency configured in the ultrasonic flowmeter 100. In case the signal detection range is not in accordance with the criterion used during configuration of the signal detection range as explained earlier, the diagnostic module 410 generates a second diagnostic event. As in the case of the first diagnostic event, the second diagnostic event may automatically initiate a signal detection range configuration as explained above. Alternatively, such diagnostic event may alert a user of the ultrasonic flowmeter 100 to halt the operation of the ultrasonic flowmeter 100 and re-configure the signal detection range.

In various embodiments of the present invention, the diagnostic module 410 may be configured to operate at predefined time intervals. Alternatively, the diagnostic module 410 may provide a user interface such that the operation of the diagnostic module 410 may be manually triggered.

Figure 5:
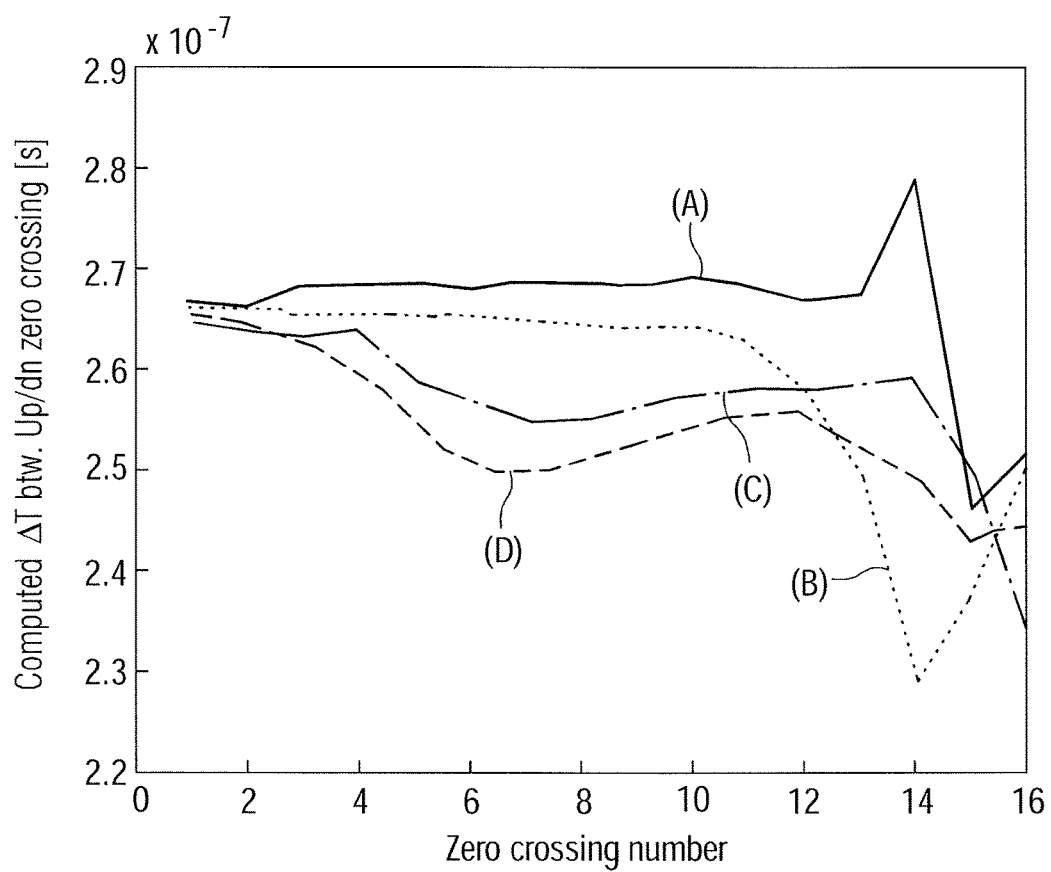
FIG. 5 illustrates a set of frequency data series plots each corresponding to a driving frequency selected from a set of driving frequencies suitable for driving a first ultrasonic transducer and a second ultrasonic transducer in accordance with one embodiment of the present invention.

FIG. 5 illustrates a set of frequency data series plots A, B, C, and D (hereinafter referred to as plots A, B, C, and D, respectively), each corresponding to a driving frequency selected from a set of driving frequencies suitable for driving a first and second ultrasonic transducers 102a, 102b.

As explained in conjunction with FIG. 4, such frequency data series plots are obtained by plotting the time difference values against the corresponding pair of data points, for example, zero-crossings. In these plots, the time difference values for tenth zero crossing and above are ignored, as the signal strength is significantly attenuated in this range.

As shown in FIG. 5, plot A provides a flat-response from the first zero crossing to the tenth zero-crossing. On the other hand, plot D provides the most drooping response, with the highest slope of the line of best fit. As shown, plots B and C provide intermediate values of the slope of the line of best fit. Hence, in case four driving frequencies are selected in the set of driving frequencies suitable for driving the ultrasonic transducers 102a, 102b, and the four driving frequencies generates the plots shown in FIG. 5 then, the driving frequency corresponding to plot A is selected as the operating frequency.

Figure 6:
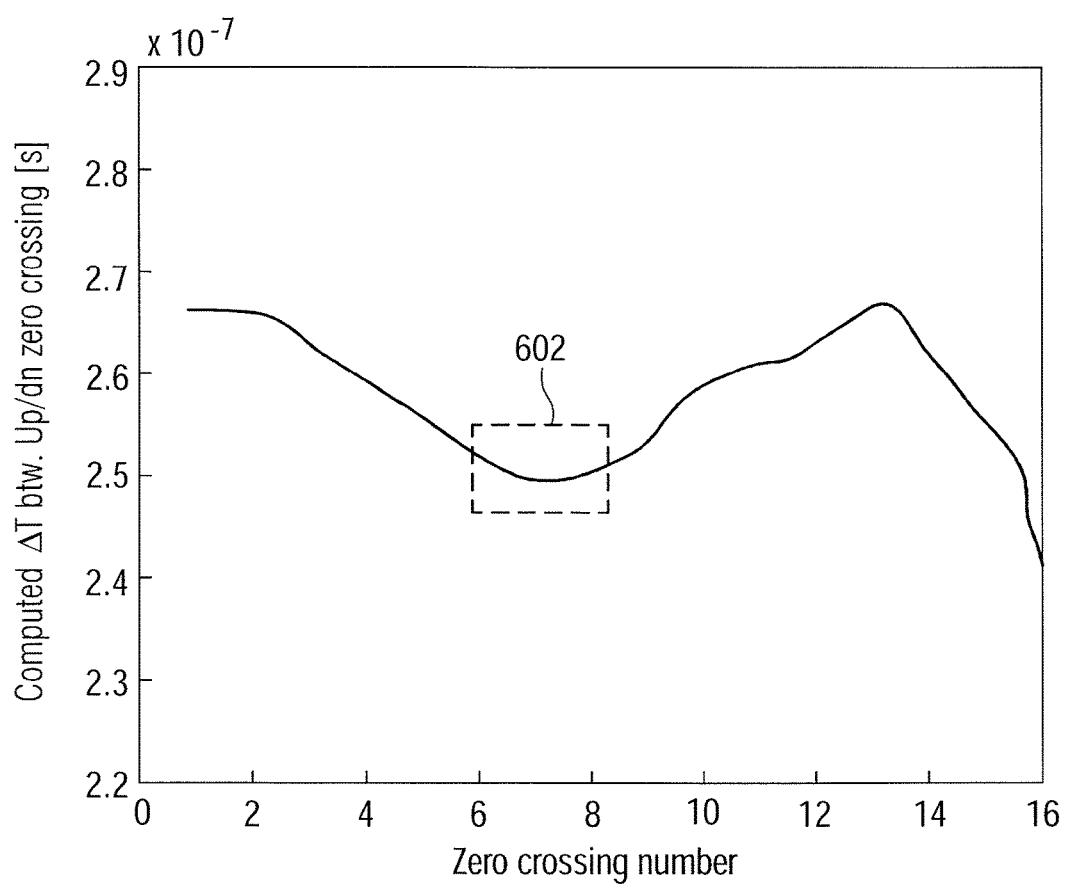
FIG. 6 illustrates a set of range data series plots corresponding to an operating frequency in accordance with one embodiment of the present invention.

FIG. 6 illustrates a set of range data series plots corresponding to an operating frequency. In order to generate the set of range data series plots, a frequency series plot is first generated. Thereafter, a sub-set of contiguous data points is selected to investigate individual range data series plots. In other words, a time window, such as time window 602, is selected, which is displaced over the frequency data series plot.

Further, as explained in conjunction with FIG. 4, the time window that provides the least value of the slope of the line of best fit is selected. In case two or more time windows provide the same or substantially same value of the slope of the line of best fit, the sub-set of contiguous data points corresponding to an earlier part of a corresponding frequency data series plot is selected. Further, additional criterion such as signal strength may be included while selecting the sub-set of contiguous data points for the signal detection range.

Figure 7:
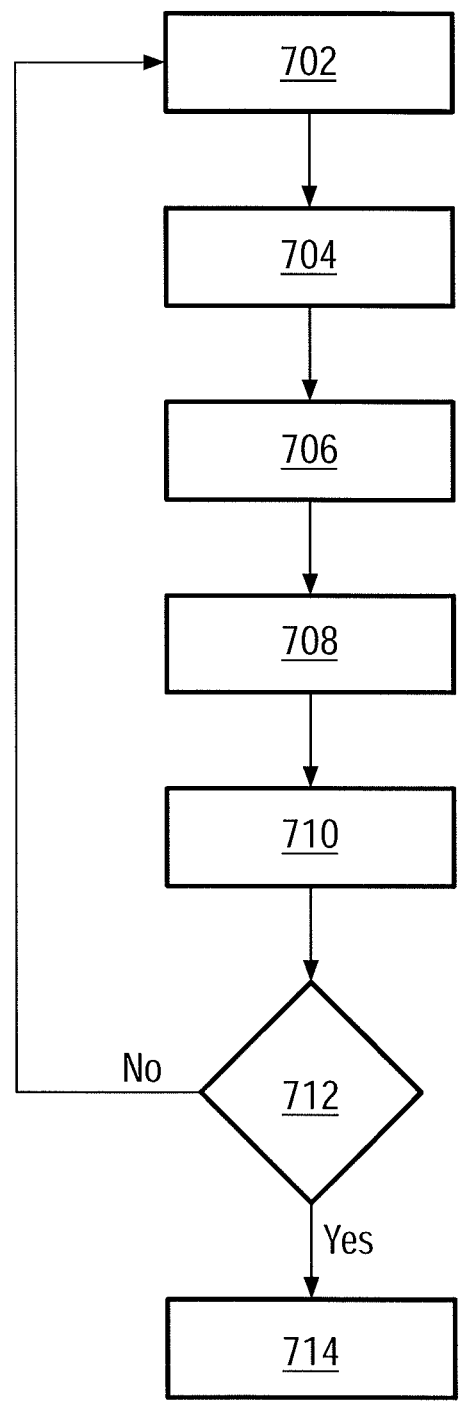
FIG. 7 illustrates a flow diagram corresponding to a method for operating an ultrasonic measurement device in accordance with one embodiment of the present invention.

FIG. 7 illustrates a flow diagram corresponding to a method for operating an ultrasonic measurement device in accordance with one embodiment of the present invention. The ultrasonic measurement device, for example an ultrasonic flowmeter 100, includes a first ultrasonic transducer and a second ultrasonic transducer.

At step 702, the first and second ultrasonic transducers are driven at a driving frequency such that the first and second ultrasonic transducers generate a first ultrasonic wave and a second ultrasonic wave, respectively.

At step 704, the second ultrasonic wave is sensed at the first ultrasonic transducer to produce a first measurement signal. Similarly, the first ultrasonic wave is sensed at the second ultrasonic transducer to produce a second measurement signal.

At step 706, a first set of data points are identified in the first measurement signal and a second set of data points are identified in the second measurement signal such that each data point in the first set of data points uniquely corresponds to a data point in the second set of data points.

At step 708, a frequency data series is generated by successively determining a time difference between time instants corresponding to each data point in the first set of data points and a corresponding data point in the second set of data points.

At step 710, one or more statistical operations are performed based on the frequency data series.

In accordance with various embodiments of the present invention, the statistical operations include, but are not limited to, determining variance, determining standard-deviation, regression analysis, and curve-fitting. In one embodiment of the present invention, the frequency data series is plotted against the position of data points in the first and second set of data points to generate a two-dimensional scatter plot and subsequently, a line of best fit is generated and the slope of the line of best fit is determined.

At step 712, the results of the one or more statistical operations are analysed. In one embodiment, if the slope of the line of best fit is determined at step 712 to be below a predefined threshold value, then step 714 is performed. Alternatively, another driving frequency is selected from a set of driving frequencies suitable for driving the first and second ultrasonic transducers and the steps 702 through 710 are performed again with the new driving frequency. In another embodiment of the present invention, the steps 702 through 710 are performed for each driving frequency in the set of driving frequencies suitable for operating the first and second ultrasonic transducers, and the driving frequency providing the least value of the slope of the line of best fit is selected as the operating frequency of the ultrasonic flowmeter. It should be noted that in various alternative embodiments of the present invention, step 712 may be implemented based on analysis of any one or more statistical operations performed at step 710.

At step 714, an operating frequency suitable for driving the first and second ultrasonic transducers is configured based on the one or more statistical operations performed at step 710.

Figure 8:
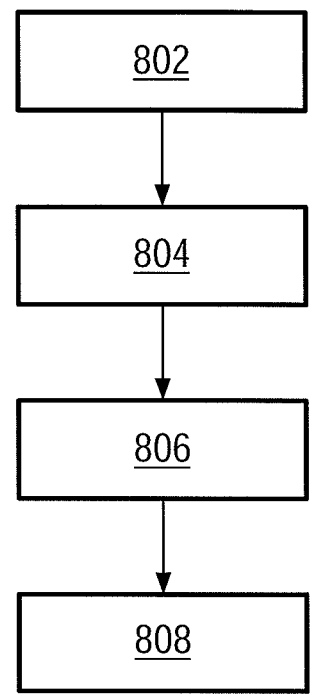
FIG. 8 illustrates a flow diagram corresponding to a method for operating an ultrasonic measurement device in accordance with another embodiment of the present invention.

FIG. 8 illustrates a flow diagram corresponding to a method for operating an ultrasonic measurement device in accordance with another embodiment of the present invention.

At step 802, a sub-set of contiguous data points is selected from the first set of data points in the frequency data series and a corresponding sub-set of contiguous data points is selected from the second set of data points in the frequency data series corresponding to an operating frequency.

At step 804, a range data series is generated by successively determining a time difference between time instants corresponding to each data point in the sub-set of the first set of data points and a corresponding data point in the sub-set of the second set of data points.

At step 806, one or more statistical operations are performed based on the range data series. These statistical operations are performed in a manner similar to that explained in step 710 in FIG. 7.

At step 808, a signal detection range suitable for detecting arrival of the first and second ultrasonic waves is configured based on the one or more statistical operations that are performed based on range data series corresponding to at least one sub-set of data points in the first set of data points.

Figure 9:
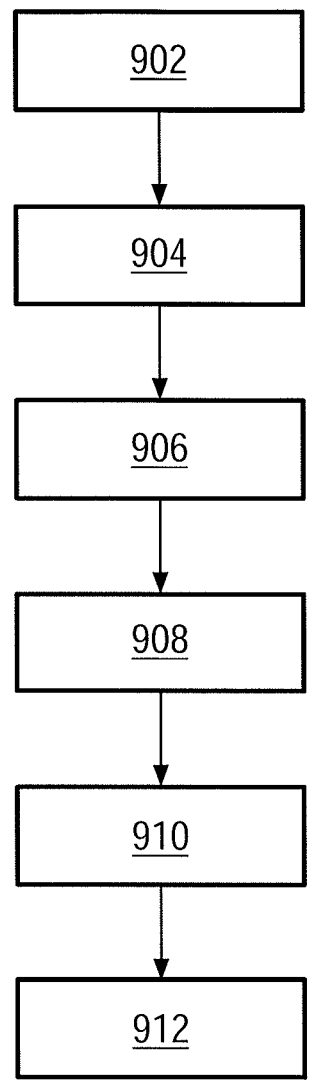
FIG. 9 illustrates a flow diagram corresponding to a method for diagnosis in an ultrasonic measurement device in accordance with one embodiment of the present invention.

FIG. 9 illustrates a flow diagram corresponding to a method for diagnosis in an ultrasonic measurement device in accordance with one embodiment of the present invention. The ultrasonic measurement device, for example an ultrasonic flowmeter 100, includes a first ultrasonic transducer and a second ultrasonic transducer.

At step 902, the first and second ultrasonic transducers are driven at an operating frequency such that the first and second ultrasonic transducers generate a first ultrasonic wave and a second ultrasonic wave, respectively.

At step 904, the second ultrasonic wave is sensed at the first ultrasonic transducer to produce a first measurement signal and the first ultrasonic wave is sensed at the second ultrasonic transducer to produce a second measurement signal.

At step 906, a first set of data points is identified in the first measurement signal and a second set of data points is identified in the second measurement signal such that each data point in the first set of data points uniquely corresponds to a data point in the second set of data points.

At step 908, a frequency data series is generated by successively determining a time difference between time instants corresponding to each data point in the first set of data points and a corresponding data point in the second set of data points.

At step 910, one or more statistical operations are performed based on the frequency data series. The one or more statistical operations are performed in the same manner as in step 710, described in conjunction with FIG. 7.

At step 912, a first diagnostic event is generated based on at least one statistical operation that is performed based on the frequency data series. In one embodiment, in case the slope of the line of best fit thus obtained is below a predefined threshold, a first diagnostic event may be generated, as described in conjunction with FIG. 7.

In an alternative embodiment of the present invention, the steps 702 through 710 are performed to generate results of one or more statistical operations corresponding to one or more driving frequencies in the set of driving frequencies. The one or more driving frequencies are different from the operation frequency. The first diagnostic is generated based on at least one driving frequency providing a more optimum operating frequency in accordance with the disclosed subject matter of the present inventions.

The diagnostic event may automatically initiate an operating frequency configuration process. Alternatively, such diagnostic event may alert a user of the ultrasonic flowmeter to halt the operation of the ultrasonic flowmeter and re-configure the operating frequency.

Figure 10:
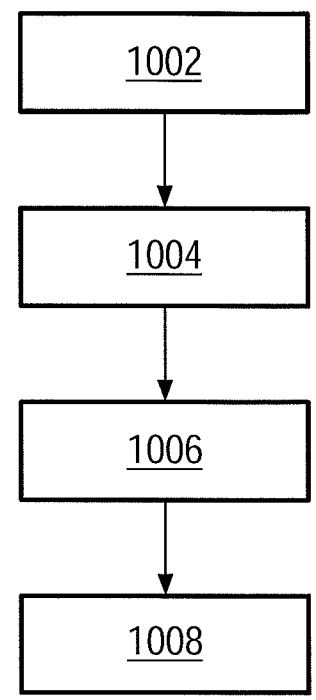
FIG. 10 illustrates a flow diagram corresponding to a method for diagnosis in an ultrasonic measurement device in accordance with another embodiment of the present invention.

FIG. 10 illustrates a flow diagram corresponding to a method for diagnosis in an ultrasonic measurement device in accordance with another embodiment of the present invention.

At step 1002, a sub-set of contiguous data points is selected from the first set of data points and a corresponding sub-set of contiguous data points is selected from the second set of data points.

At step 1004, a range data series is generated by successively determining a time difference between time instants corresponding to each data point in the sub-set of the first set of data points and a corresponding data point in the sub-set of the second set of data points corresponding to an operating frequency.

At step 1006, one or more statistical operations are performed based on the range data series. The one or more statistical operations are performed in the same manner as in step 710, described in conjunction with FIG. 7.

At step 1008, a second diagnostic event is generated based on at least one statistical operation based on the range data series. In various embodiments of the present invention, if the signal detection range is not in accordance with the criterion used during configuration of the signal detection range as explained in conjunction with FIG. 9, the second diagnostic event is generated. As in the case of the first diagnostic event, the second diagnostic event may automatically initiate a signal detection range configuration process. Alternatively, such diagnostic event may alert a user of the ultrasonic flowmeter to halt the operation of the ultrasonic flowmeter and re-configure the signal detection range.

Thus, the present invention provides, among other things, an ultrasonic measurement device suitable for operation under non-reciprocal conditions. The present invention provides systems and methods for detection of an optimum operating frequency at which the effects of non-reciprocity are minimized. Further, the present invention facilitates detection of ultrasonic signals based on an optimum trade-off between signal strength and effects of non-reciprocal conditions for a given operating frequency.

Further, the present invention provides systems and methods for diagnosis in the ultrasonic measurement device and indicates erroneous operation in case the ultrasonic measurement device is not driven at an optimum frequency under non-reciprocal conditions. In addition, the present invention facilitates indicating erroneous operation in case detection of ultrasonic signals deviates from an optimum trade-off between signal strength and effects of non-reciprocal conditions.

While the present invention has been described in detail with reference to certain embodiments, it should be appreciated that the present invention is not limited to those embodiments. In view of the present disclosure, many modifications and variations would present themselves to those of skill in the art without departing from the scope and spirit of this invention. The scope of the present invention is, therefore, indicated by the following claims rather than by the foregoing description. All changes, modifications, and variations coming within the meaning and range of equivalency of the claims are to be considered within their scope.

What is claimed is:

1. A method for performing diagnostics via an ultrasonic measurement device operating under non-reciprocal conditions and including a first ultrasonic transducer and a second ultrasonic transducer operating in a clamp-on configuration, the method comprising steps of:
   (a) driving the first ultrasonic transducer and the second ultrasonic transducer at an operating frequency such that the first ultrasonic transducer and the second ultrasonic transducer each generate a first ultrasonic signal and a second ultrasonic signal along with a plurality of acoustic reflections generated by the first ultrasonic transducer and the second ultrasonic transducer operating in the clamp-on configuration, respectively;

(b) sensing the second ultrasonic signal at the first ultrasonic transducer operating in the clamp-on configuration to produce a first measurement signal and sensing the first ultrasonic signal at the second ultrasonic transducer operating in the clamp-on configuration to produce a second measurement signal;

(c) identifying a first set of data points in the first measurement signal produced by the first ultrasonic transducer operating in the clamp-on configuration and a second set of data points in the second measurement signal produced by the second ultrasonic transducer operating in the clamp-on configuration, wherein each data point in the first set of data points uniquely corresponds to a data point in the second set of data points;

(d) generating a frequency data series by successively determining a time difference between time instants corresponding to each data point in the first set of data points and a corresponding data point in the second set of data points;

(e) performing one or more statistical operations based on the frequency data series; and (f) generating a first diagnostic event based on at least one statistical operation based on the frequency data series.

2. The method of claim 1, wherein steps (a) through (e) are performed for at least one driving frequency in a set of driving frequencies suitable for driving the first ultrasonic transducer and the second ultrasonic transducer such that the driving frequency is not same as the operating frequency, and wherein the first diagnostic event is generated based on (1) at least one statistical operation corresponding to the at least one driving frequency and (2) at least one statistical operation corresponding to the operating frequency.

3. The method of claim 1, further comprising:

(g) selecting a sub-set of contiguous data points from the first set of data points and a corresponding sub-set of contiguous data points from the second set of data points;

(h) generating a range data series by successively determining a time difference between time instants corresponding to each data point in the sub-set of the first set of data points and a corresponding data point in the sub-set of the second set of data points;

(i) performing one or more statistical operations based on the range data series; and (j) generating a second diagnostic event based on at least one statistical operation based on the range data series.

4. The method of claim 1, wherein the one or more statistical operations comprise at least one of determining variance, determining standard-deviation, regression analysis, and curve-fitting.

* * * * *